J. L. WENTZ.
CONVEYING BELT.
APPLICATION FILED MAY 21, 1919.
1,422,398.
Patented July 11, 1922.
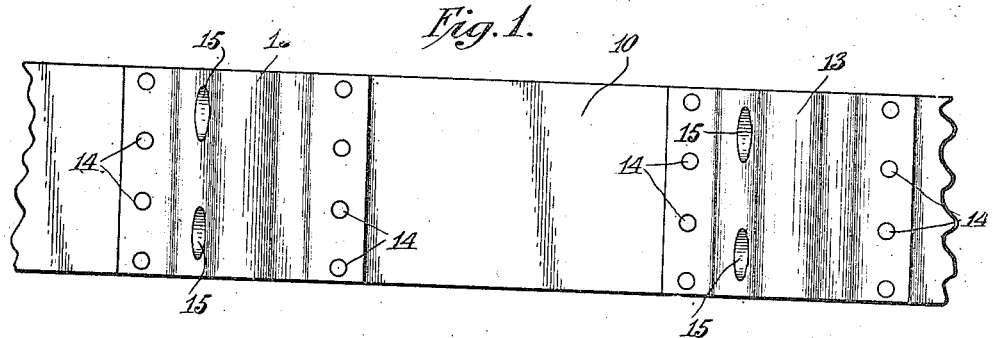
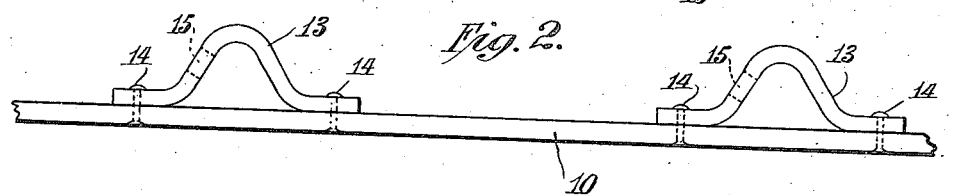
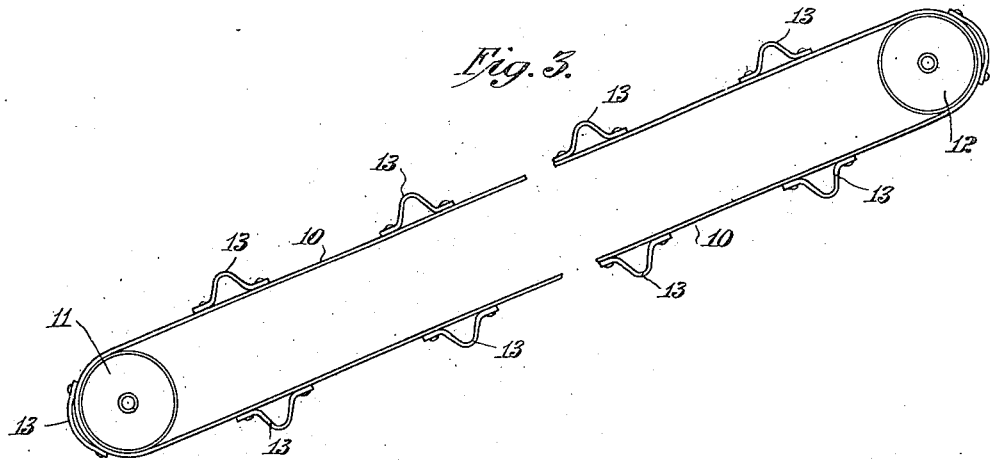
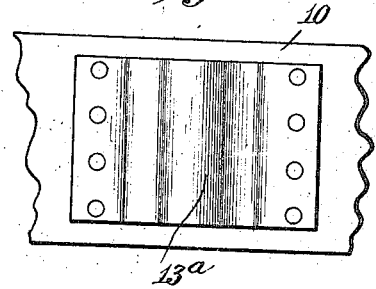 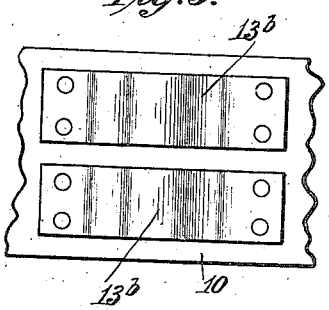 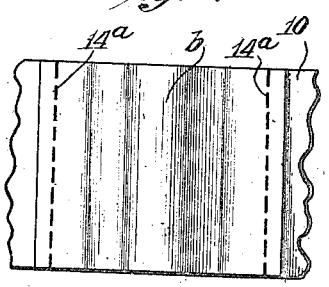
INVENTOR
Jere L. Wentz
BY
ATTORNEY

UNITED STATES PATENT OFFICE.

JERE L. WENTZ, OF PASSAIC, NEW JERSEY.

CONVEYING BELT.

1,422,398.  Specification of Letters Patent.  Patented July 11, 1922.

Application filed May 21, 1919. Serial No. 298,625.

*To all whom it may concern:*

Be it known that I, JERE L. WENTZ, a citizen of the United States, residing at Passaic, in the county of Passaic, State of New Jersey, have invented certain new and useful Improvements in Conveying Belts, of which the following is a specification.

My invention relates to improvements in conveying belts adapted particularly for conveying without injury such relatively fragile articles as sugar beet, apples, potatoes and the like.

The principal object of the invention is to provide a conveying belt of this type having rests or supports for the articles being conveyed, so that when the belt travels on an incline the articles carried thereby will be prevented from rolling or falling backward.

The object of my invention is accomplished by securing to the belt in any suitable manner flights spaced at greater or less intervals, and so constructed that when the belt passes over the pulleys which are usually used for guiding such belts, the flights will elongate so as to lie almost parallel to the belt at the place where the belt is curved as it passes over the pulley. Such flights may also be provided with openings to enable the removal of dust or dirt which might settle under the flights.

The invention is illustrated in the accompanying drawing in which—

Fig. 1 is a plan view of a fragment of the improved conveying belt;

Fig. 2 is a side elevational view thereof;

Fig. 3 is a side elevational view illustrating the improved belt travelling over the pulleys;

Fig. 4 is a view similar to Fig. 1, of one modified form of the invention;

Fig. 5 is a similar view of another modified form; and

Fig. 6 is a view of a still further modified form.

Referring to the drawing, and particularly to Figs. 1 to 3 thereof, 10 is a conveying belt of usual construction which is designed to pass over guide idlers or pulleys 11 and 12. As shown in Fig. 3, the belt runs on an incline for the purpose of conveying articles from a lower to a higher plane. The usual arrangement is for the lower pulley 11 to be adjacent to a source of supply such as a bin into which the articles are originally charged, and the upper pulley 12 to be adjacent the top of a freight car or the like into which the articles are discharged.

Attached at intervals to the belt 10 are flights 13 which comprise sections of flexible belt material or the like, the opposite ends of the flights being attached to the belt proper by suitable means, such as rivets 14 which is the attaching means shown in Figs. 1, 2 and 3. In securing the flights to the belt 10 the flights are arched as clearly indicated in Figs. 2 and 3 so as to provide projections extending beyond the plane of the belt 10 and forming supports or rests to prevent the articles from rolling back on the belt. In the form of Figs. 1 to 3, the flights extend the entire width of the belt, while in the modified form of Fig. 4 the width of the flight 13$^a$ is somewhat less than that of the belt 10. In the modification of Fig. 5, each flight consists of two parallel relatively narrow members 13$^b$ which together are not quite as wide as the belt 10. In Fig. 6 the flight $b$ is integral and extends entirely across the belt 10, and the construction differs merely from that of Fig. 1 in that the flight is secured to the belt by stitching 14$^a$ in lieu of the rivets 14.

If desired the rear face of each flight may be provided with openings 15 through which any accumulated material may be removed from under the flight.

Referring to Fig. 3, it will be noted that as the flights pass over the pulleys 11 and 12 they elongate, due to their flexibility, thus preventing rupture of the flights, and also preventing their projecting to any substantial extent beyond the plane of the belt which might interfere with the travel of the latter when the conveyor as a whole is close up against the object from which or to which the articles are being carried.

The operation will be obvious to those skilled in the art, and consists in feeding the articles to the belt, such articles arranging themselves between the flights and being prevented by the latter from falling off the belt.

I desire it to be understood that the invention is not limited to the precise details of structure shown and described as it will be readily apparent that different modes, other than those shown, of attaching the flights to the belt may be adopted and that different forms of the flight may be used without departing from the spirit of the invention.

What I claim is:—

A flexible conveyer belt comprising a single layer of flexible material, a plurality of independent flexible flights supported at intervals directly upon said belt, each flight comprising a section of integral flexible material having its middle portion normally arched away from the belt and its opposite ends secured to said belt parallel to the latter, said flights elongating, when said belt passes over a pulley, to lie substantially parallel to said belt.

In testimony whereof I have affixed my signature in presence of two witnesses.

JERE L. WENTZ.

Witnesses:
ANNIE E. EWART,
HENRY C. WHINBURN.